(12) United States Patent
Koo et al.

(10) Patent No.: US 11,917,257 B2
(45) Date of Patent: Feb. 27, 2024

(54) DISPLAY DEVICE AND DISPLAY SYSTEM

(71) Applicant: LG ELECTRONICS INC., Seoul (KR)

(72) Inventors: Changbum Koo, Seoul (KR); Dahee Kim, Seoul (KR); Kwangwoo Heo, Seoul (KR); Jongho Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/778,120

(22) PCT Filed: Nov. 26, 2019

(86) PCT No.: PCT/KR2019/016351
§ 371 (c)(1),
(2) Date: May 19, 2022

(87) PCT Pub. No.: WO2021/107172
PCT Pub. Date: Jun. 3, 2021

(65) Prior Publication Data
US 2022/0417607 A1  Dec. 29, 2022

(51) Int. Cl.
*H04N 21/488* (2011.01)
*H04N 21/4722* (2011.01)

(52) U.S. Cl.
CPC ..... *H04N 21/4884* (2013.01); *H04N 21/4722* (2013.01)

(58) Field of Classification Search
CPC .. H04N 21/4884; H04N 21/4722; G06F 3/14; G10H 1/365; G10H 2220/011; G10H 2240/211; G10H 1/36; G09G 5/08; G09G 2354/00; G09G 2370/10; G09G 2370/16; G11B 20/10
See application file for complete search history.

(56) References Cited

U.S. PATENT DOCUMENTS

| | | | |
|---|---|---|---|
| 2013/0065213 A1 | 3/2013 | Gao et al. | |
| 2016/0124703 A1 | 5/2016 | So et al. | |
| 2016/0359932 A1* | 12/2016 | Cho | .................... H04N 21/4622 |

(Continued)

FOREIGN PATENT DOCUMENTS

| | | | |
|---|---|---|---|
| CN | 101800869 A | | 8/2010 |
| KR | 10-2007-0091394 A | | 9/2007 |
| KR | 1020070091394 | * | 9/2007 |

(Continued)

*Primary Examiner* — Kunal Langhnoja
(74) *Attorney, Agent, or Firm* — Birch, Stewart, Kolasch & Birch, LLP (57) ABSTRACT

The present disclosure relates to a display device and a display system for providing lyrics when reproducing music of the external device, regardless of a connection state of an external device. The display device includes: a display; a controller configured to receive a music reproduction command through an external device; and an audio output interface configured to output music received from the external device, wherein, when the controller receives the music reproduction command, the controller is configured to request lyric information to the external device, and when the controller receives the lyric information from the external device, the controller is configured to display lyrics through the display while outputting the music.

6 Claims, 7 Drawing Sheets

(56) References Cited

U.S. PATENT DOCUMENTS

2017/0155866 A1\* 6/2017 Shi .................. H04N 21/42204
2017/0301328 A1 10/2017 Saito

FOREIGN PATENT DOCUMENTS

| KR | 10-0845620 B1 | 7/2008 |
| KR | 10-2012-0044082 A | 5/2012 |
| KR | 10-2016-0053415 A | 5/2016 |
| KR | 10-2016-0142184 A | 12/2016 |
| KR | 10-2017-0096394 A | 8/2017 |

\* cited by examiner

DISPLAY DEVICE AND DISPLAY SYSTEM

CROSS REFERENCE TO RELATED APPLICATIONS

This application is the National Stage filing under 35 U.S.C. 371 of International Application No. PCT/KR2019/016351, filed on Nov. 26, 2019, which is hereby expressly incorporated by reference into the present application.

TECHNICAL FIELD

The present disclosure relates to a display device and a display system, and more particularly, to a display device and a display system for reproducing music of an external device.

BACKGROUND ART

Recently, a user's interest in and frequency of use of a function for sharing various media contents among devices such as smartphones and other home appliances, for example, TVs, computers, and cameras are increasing.

In response to such user demands, a Digital Living Network Alliance (DLNA) standard has appeared and is being used. The DLNA standard can refer to a technology for sharing and reproducing various media contents (music/photo/video, etc.) through a network between devices regardless of a manufacturer, a product type, etc.

For example, the DLNA standard makes it possible to display photos taken by a camera on a computer or a TV, to reproduce a movie stored in a PC on a TV, or to reproduce music stored in a smartphone on a TV.

On the other hand, since the DLNA standard does not provide an application programming interface (API) for extracting lyric information of music, there may occur a problem in that a music reproduction device cannot output lyrics according to the DLNA standard.

DISCLOSURE OF INVENTION

Technical Problem

The present disclosure aims to provide a display device and a display system for extracting lyric information from an external device and providing the extracted lyric information when reproducing music of the external device.

The present disclosure aims to provide a display device and a display system for receiving lyric information from an external device when reproducing music shared according to a Digital Living Network Alliance (DLNA) standard.

Technical Solution

A display device according to an embodiment of present disclosure comprises a display, a controller configured to receive a music reproduction command through an external device, and an audio output interface configured to output music received from the external device, wherein the controller further configured to request lyric information to the external device if receiving the music reproduction command, and display lyrics through the display while outputting the music if receiving the lyric information form the external device.

When the music of the external device is received according to a Digital Living Network Alliance (DLNA) standard, the controller is configured to request the lyric information to the external device.

The controller is configured to receive the lyric information through an app-to-app connection.

When the music of the external device is reproduced according to a DLNA standard, the controller is configured to receive the lyric information from the external device through an app-to-app connection.

The controller further configured to request lyric information to the external device if the external device is wirelessly connected, and extract the lyric information through metadata scan of content stored in the external device if the external device is connected through an external input terminal.

The controller comprises a file browsing module configured to list contents of the external device, a contents module configured to scan the contents listed by the file browsing module and metadata of the contents, a reproducer configured to reproduce the contents, and a gate module configured to receive the lyric information from the external device.

The display system according to an embodiment of present disclosure comprises an external device, and a display device configured to output music received from the external device when a music reproduction command is received through the external device, wherein the display device further configured to request lyric information to the external device if receiving the music reproduction command, and display lyrics received from the external device while outputting the music.

When the music of the external device is reproduced according to a Digital Living Network Alliance DLNA standard, the display device is configured to request the lyric information to the external device, and the external device is configured to transmit the lyric information to the display device in response to the request.

The display device is configured to request the lyric information to the external device through an app-to-app connection, and the external device is configured to receive a request for the lyric information from the display device through the app-to-app connection.

The display device is further configured to obtain the lyric information through an app-to-app connection with the external device if the external device is wirelessly connected, and obtain the lyric information by scanning metadata of content stored in the external device if the external device is connected through an external input terminal.

Advantageous Effects

According to an embodiment of the present disclosure, there is an advantage that a display device can also provide lyric information when reproducing music of an external device. In particular, the display device can more easily provide music and lyric information by extracting the lyric information from the external device when reproducing music of the external device according to a Digital Living Network Alliance (DLNA) standard.

In addition, since the display device receives the lyric information from the external device without extracting the lyric information from the inside, the scanning of the lyric information is omitted. Therefore, the operational burden can be reduced and the time required to output the lyric information can be shortened.

In addition, since the display device obtains the lyric information from the external device through an app-to-app connection, there is an advantage that the lyric information can be obtained regardless of the type of the external device.

BEST MODE FOR CARRYING OUT THE INVENTION

Hereinafter, the embodiments disclosed herein will be described in detail with reference to the accompanying drawings, and the same or similar elements are designated with the same numeral references regardless of the numerals in the drawings and their redundant description will be omitted.

The suffixes "module" and "unit or portion" for components used in the following description are merely provided only for facilitation of preparing this specification, and thus they are not granted a specific meaning or function.

In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein is not limited by the accompanying drawings. Therefore, the present disclosure should be construed as including all the changes, equivalents, and substitutions included in the spirit and scope of the present disclosure.

As used herein, singular forms may include plural forms as well unless the context clearly indicates otherwise.

It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

Figure 1:
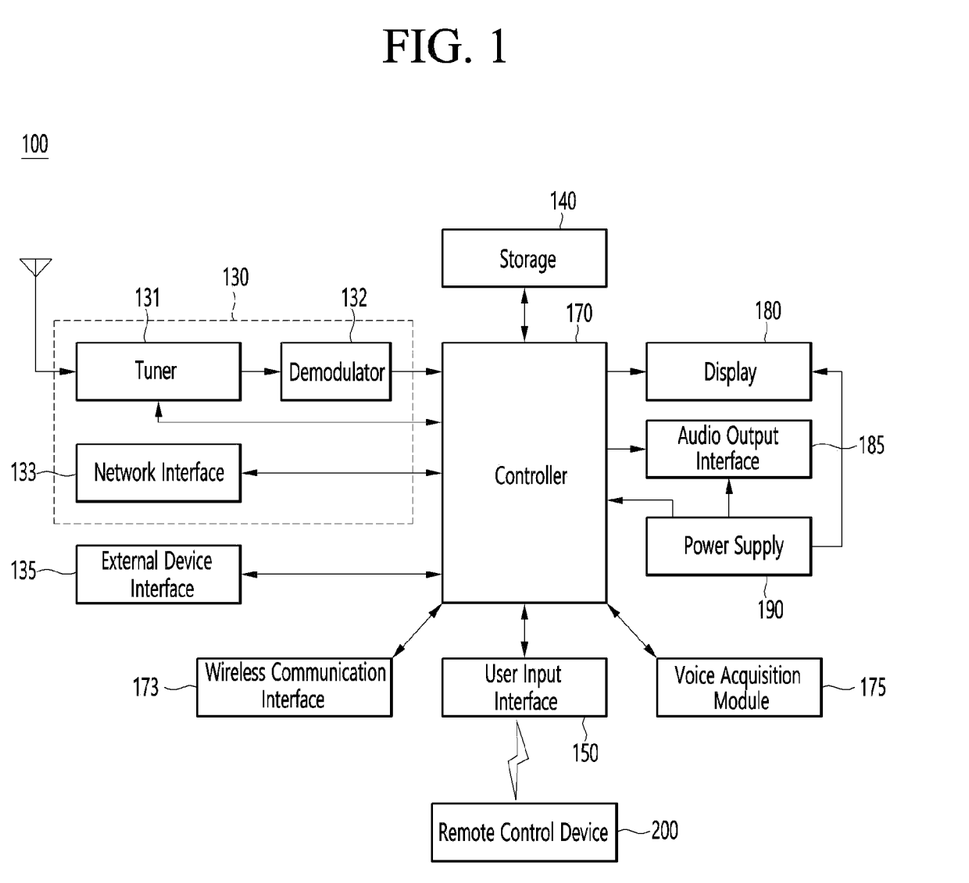
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices preregistered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID) Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 can include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 can include a converter for converting an AC power source into a DC power source, and a DC/DC converter for converting a level of the DC source power.

Figure 2:
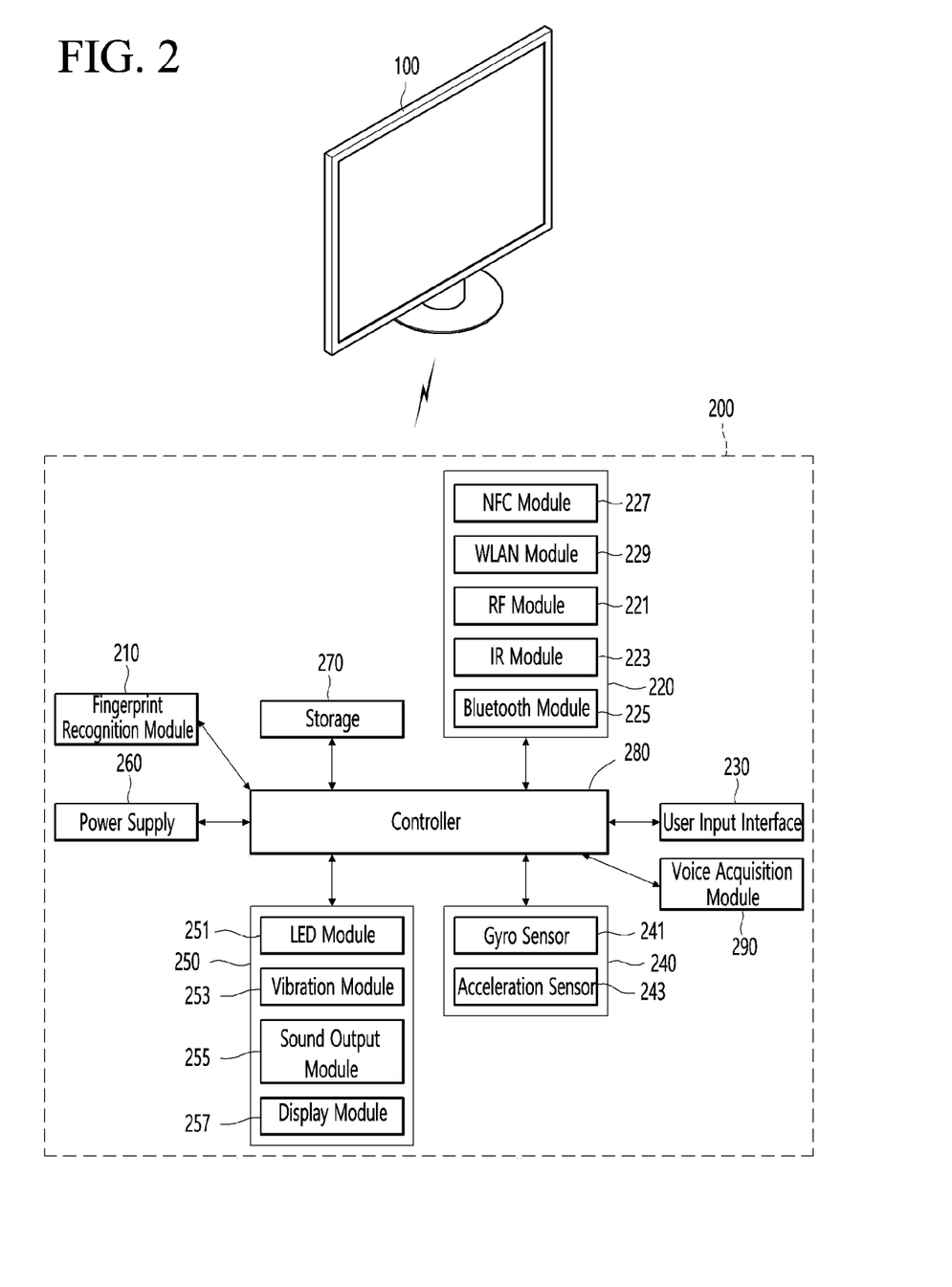
FIG. 2 is a block diagram illustrating a remote control device according to an embodiment of the present disclosure.
Figure 3:
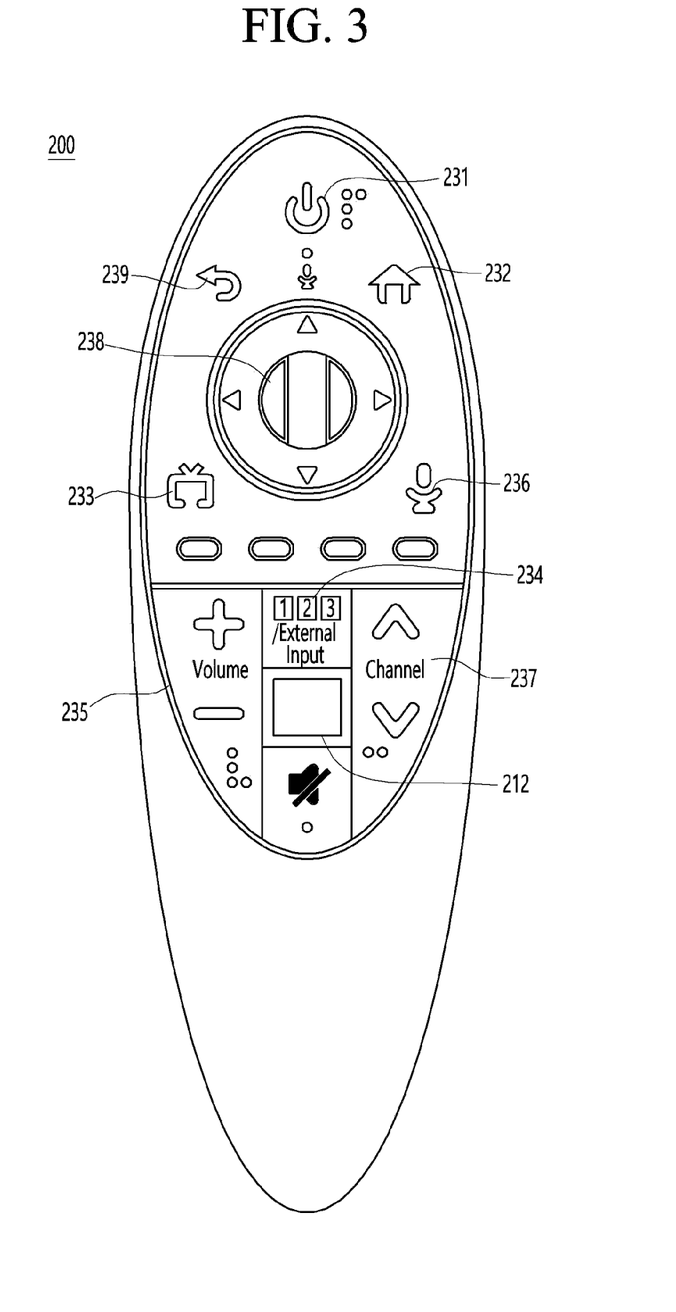
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 230, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
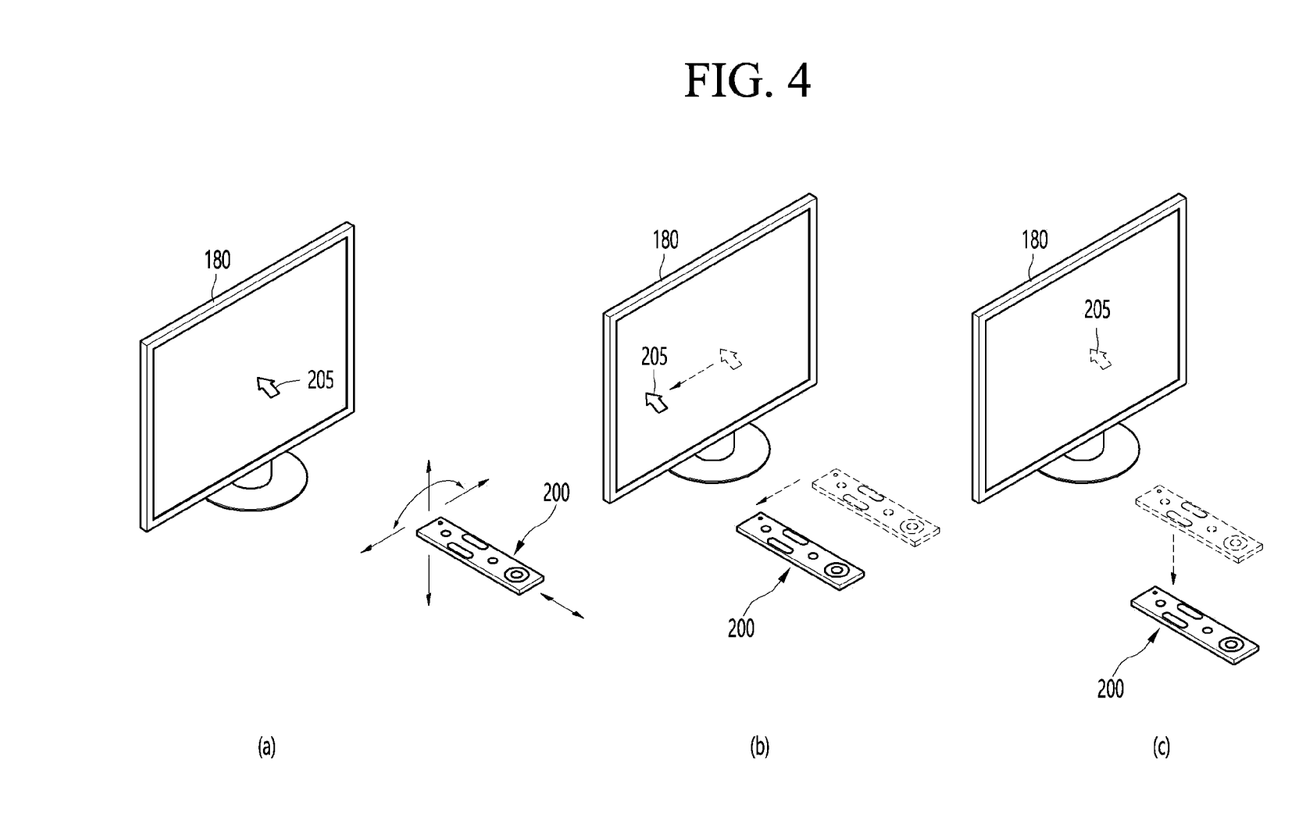
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The display device 100 can output music of an external device. The display device 100 can reproduce music received from the external device. That is, the display device 100 can share the music of the external device.

The external device can include a storage device such as a USB, or a mobile terminal such as a smartphone. However, it is noted that the type of the above-described external device is only an example, and the type of the external device to be connected to the display device 100 is not limited. That is, the display device 100 can reproduce music of various types of external devices.

For example, the display device 100 can reproduce music received through a smartphone or a USB memory connected through the external device interface 135.

In particular, when the display 100 reproduces music of the external device connected wirelessly, such as a smartphone, the display device 100 can reproduce music according to the DLNA standard.

In detail, the display device 100 can share media (e.g., music, photos, moving pictures, etc.) of the wirelessly connected external device according to the DLNA standard.

The DLNA can refer to a protocol between products through a DLNA certification to share and reproduce various media contents (music/photo/video) through a network regardless of a manufacturer and a product type.

Accordingly, if the display device 100 is in the same IP band as devices having a network function such as Ethernet, Wi-Fi, Bluetooth, etc., the display device 100 can share contents through a network rather than a physical connection.

For example, when the display device 100 reproduces music of a USB memory or a smartphone, the USB memory or the smartphone can be a digital media server (DMS).

The DMS can be a device that actually holds contents to be shared. The DMS stores the contents, and distributes/ transmits content details upon access to the network, so that other devices can use the contents.

According to the DLNA, it is possible to share image files such as JPEG, GIF, TIFF, PNG, etc., music files such as LPCM, AAC, AC-3, ATRAC3plus, MP3, WMA9, etc., and video files such as MPEG2, MPEG1, MPEG4, WMV9, AVI, etc.

On the other hand, when the display device 100 reproduces music of the external device according to the DLNA standard, the DLNA standard makes it impossible to share the lyrics file. Thus, lyrics cannot be displayed through the display 180.

Figure 5:
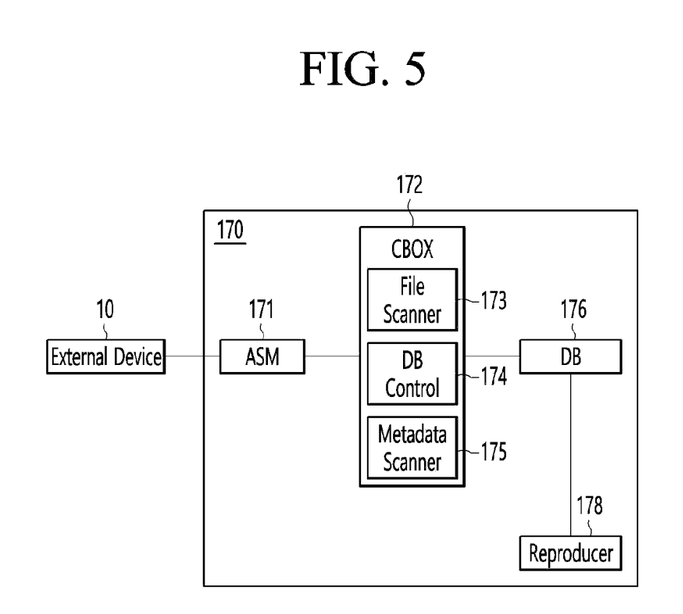
FIG. 5 is a block diagram for describing a method by which a conventional display device reproduces music of an external device according to a DLNA standard.

FIG. 5 is a block diagram for describing a method by which a conventional display device reproduces music of an external device according to a DLNA standard.

The controller 170 can include at least some or all of a file browsing module, a contents module, a DB 176, and a reproducer.

The file browsing module can list contents of an external device 10. That is, the file browsing module can generate a contents list of contents that can be shared by DLNA in the external device 10.

The file browsing module can be an attached storage manager (ASM) 171. The ASM can register the contents list of a connected external device such as a USB memory, an external hard drive, or a smartphone.

The contents module can be a module that scans contents and metadata of the external device connected to the display device 100. The contents module can scan the contents listed by the file browsing module and the metadata of the contents.

The contents module can receive the contents list from the file browsing module, and can scan each content included in the received contents list and the metadata of each content.

For example, the contents module can extract a singer, a song title, an image, etc. from a music file of the external device 10 and metadata of the music file.

The contents module can be a contents box (CBOX) 172. The CBOX 172 can include at least some or all of a file scanner 173, a DB control 174, and a metadata scanner 175.

The file scanner 173 can scan the contents of the contents list received from the file browsing module. The file scanner 173 can scan files stored in the external device 10.

For example, when the external device 10 is a USB memory, the file scanner 173 can be a USB scanner, and when the external device 10 is a device wirelessly connected to the display device 100, the file scanner 173 can be a DLNA scanner.

The DB control 174 can store the contents scanned by the file scanner 173 and contents-related information in the DB 176.

The metadata scanner 175 can scan metadata of the contents scanned by the file scanner 173.

The DB 176 can store data scanned by the file scanner 173. For example, the DB 176 can store contents scanned by the file scanner 173 and contents-related information.

The reproducer 178 can reproduce the contents scanned by the contents module. The reproducer 178 can reproduce the contents stored in the DB 176.

If the external device 10 is a physically connected device such as a USB memory, when music of the external device 10 is reproduced, the controller 170 can extract lyric information by extracting file information (e.g., ID3 tag) of a music file (e.g., mp3 file) through the metadata scanner 175. That is, the reproducer 178 can receive the lyric information from the metadata scanner 175 while reproducing music, and can control the display 180 to display lyrics based on the received lyric information.

On the other hand, if the external device 10 is a wirelessly connected device, the controller 170 cannot extract the lyrics through the metadata scanner 175. This is because there is no application programming interface (API) for extracting lyric information between devices in the DLNA standard.

Therefore, when the display device 100 reproduces music according to the DLNA standard, only music is provided to the user and lyrics are not provided to the user, thus deteriorating user convenience.

Figure 6:
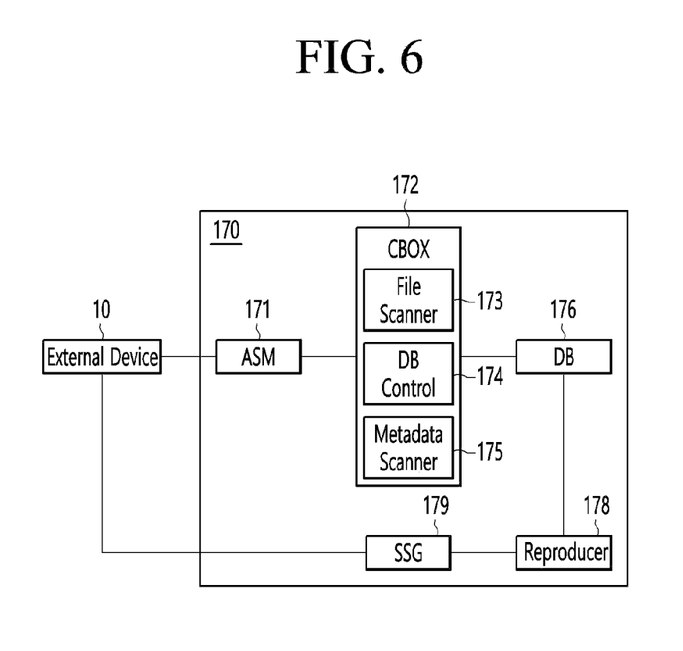
FIG. 6 is a block diagram for describing a method by which the display device according to the present disclosure reproduces music of the external device.

FIG. 6 is a block diagram for describing a method by which the display device according to the present disclosure reproduces music of the external device.

The controller 170 can include a gate module, and at least some or all of a file browsing module, a contents module, a DB 176, and a reproducer.

That is, compared with FIG. 5, the controller 170 of the display device 100 according to an embodiment of the present disclosure can further include the gate module.

Since the file browsing module, the contents module, the DB 176, and the reproducer are the same as those described with reference to FIG. 5, redundant descriptions thereof are omitted.

The gate module can receive information from the external device 10. The gate module can receive the lyric information from the external device 10 and provide the received lyric information to the reproducer 178.

The gate module can be a second screen gateway (SSG) 179. The SSG can be a module that allows the display device 100 to communicate with the wirelessly connected external device. The SSG can transmit data composed of a header and a payload, and can add text to the payload.

On the other hand, the external device 10 can include a framework for communicating with the SSG. For example, the framework can be a connect SDK, and the connect SDK can be an open source framework that connects an application of the external device 10 to the display device 100.

The display device 100 can be connected to the external device 10 through the gate module by an app-to-app connection.

The display device 100 can receive the lyric information from the external device 10 by the app-to-app connection with the external device 10. This will be described in more detail with reference to FIG. 7 below.

Figure 7:
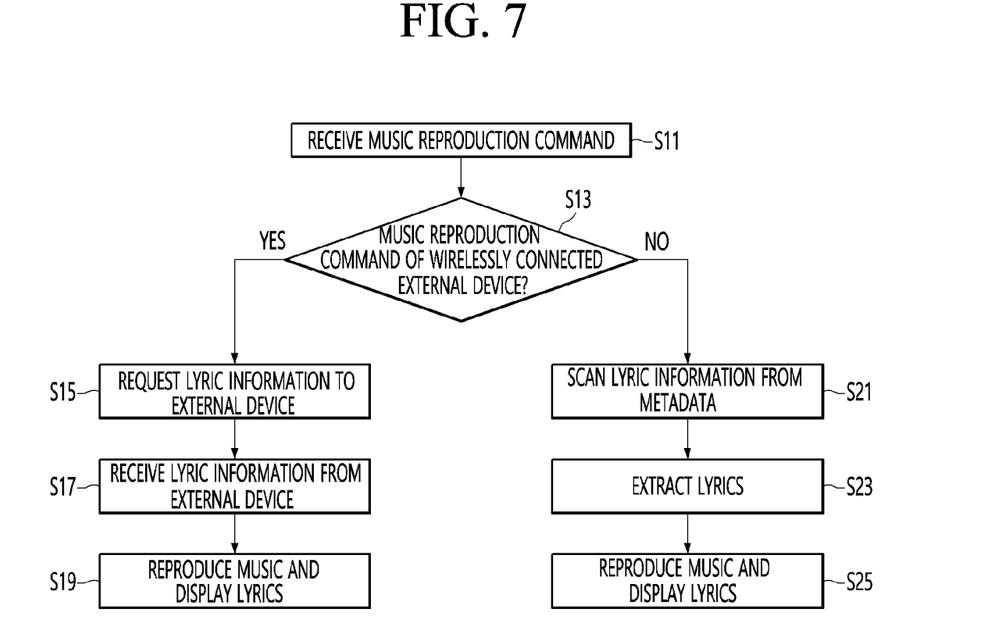
FIG. 7 is a flowchart illustrating an operating method of a display device according to an embodiment of the present disclosure.

FIG. 7 is a flowchart illustrating an operating method of a display device according to an embodiment of the present disclosure.

The controller 170 can receive a music reproduction command (S11).

The music reproduction command can be a music reproduction command stored in the storage 140 of the display device 100 or a music reproduction command received through the external device 10.

The music reproduction command received through the external device 10 can be a music reproduction command received through an external device, such as a USB memory, to which the DMS is physically connected, or a music reproduction command received through an external device, such as a smartphone, to which the DMS is wirelessly connected.

When the controller 170 receives the music reproduction command, the controller 170 can determine whether the music reproduction command is a music reproduction command of a wirelessly connected external device (S13).

Specifically, the controller 170 can determine whether music is received from the external device through the DLNA standard.

For example, when music according to the music reproduction command is received from the external device through the DLNA standard, the controller 170 can determine that the music reproduction command is the music reproduction command of the wirelessly connected external device, and when music according to the music reproduction command is not received from the external device through the DLNA standard, the controller 170 can determine that the music reproduction command is not the music reproduction command of the wirelessly connected external device.

When the music reproduction command is the music reproduction command of the wirelessly connected external device, the controller 170 can request lyric information to the external device (S15).

Specifically, the controller 170 can form an app-to-app channel with the external device through the gate module, and can request lyric information to the application of the external device.

The controller 170 can receive lyric information from the external device (S17).

The controller 170 can receive lyric information from the external device in response to the request for lyric information.

When the controller 170 receives the music reproduction command from the wirelessly connected external device, the controller 170 can receive lyric information through an app-to-app connection with the external device. That is, when the music of the external device is reproduced according to the DLNA standard, the controller 170 can receive lyric information from the external device through an app-to-app connection.

When the controller 170 receives the lyric information, the controller 170 can reproduce music and display lyrics (S19).

When the controller 170 receives the lyric information, the controller 170 can control the audio output interface 185 to output music received from the external device, and can control the display 180 to display lyrics according to the lyric information.

In summary, when the controller 170 receives the music reproduction command through the external device, the controller 170 can request the lyric information to the external device, and the controller 170 receives the lyric information from the external device, the controller 170 can display lyrics through the display 180 while outputting music.

That is, when the controller 170 receives music of the external device according to the DLNA standard, the controller 170 can display lyrics by requesting the lyric information from the external device and receiving the lyric information from the external device.

On the other hand, when the music reproduction command is not the music reproduction command of the wirelessly connected external device in operation S13, the controller 170 can scan lyric information from the metadata (S21).

That is, when the external device is wirelessly connected, the controller 170 can obtain the lyric information by requesting the lyric information from the external device, and when the external device is connected through a physical connection, such as an external input terminal, the controller 170 can scan metadata of the content stored in the external device.

The controller 170 can extract the lyric information through metadata scan (S23).

That is, the controller 170 can request the lyric information to the contents module 172, and the contents module can provide the lyric information to the reproducer 178 through metadata scan.

For example, the contents module can extract an ID3 tag of a music file according to the music reproduction command and transmit the extracted ID3 tag to the reproducer 178.

The controller 170 can control the display 180 to display the lyrics extracted through metadata scan while reproducing music (S25).

Figure 8:
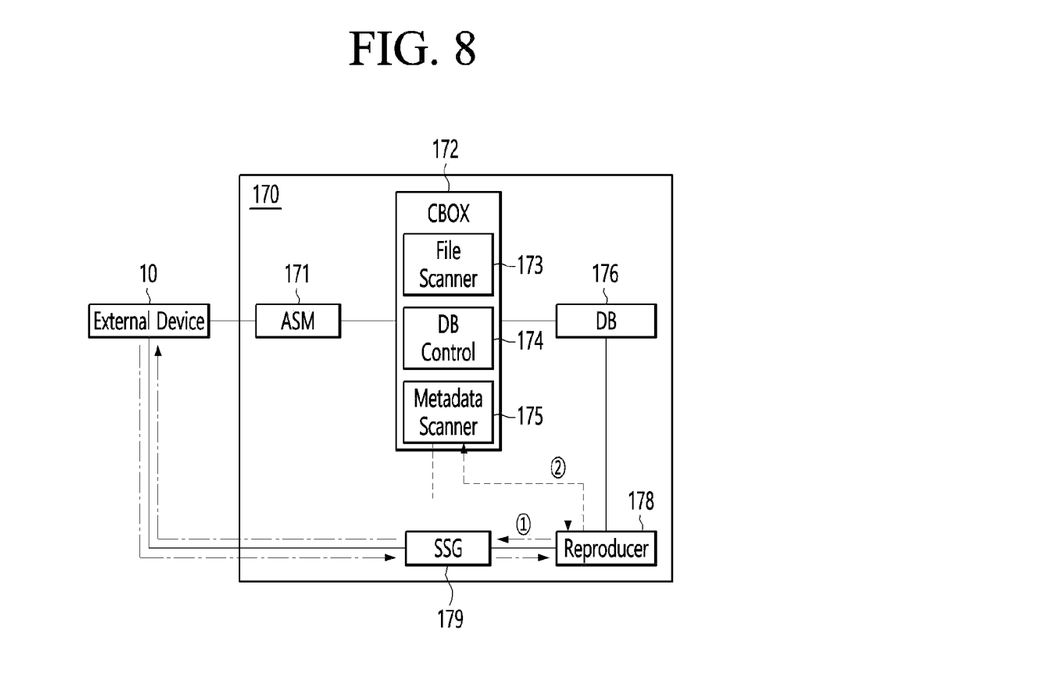
FIG. 8 is a diagram for describing a method by which the display device obtains lyrics, according to an embodiment of the present disclosure.

FIG. 8 is a diagram for describing a method by which the display device obtains lyrics, according to an embodiment of the present disclosure.

When the reproducer 178 reproduces music through the wirelessly connected external device, the reproducer 178 can obtain lyric information through an app-to-app connection with the external device. Specifically, as indicated by an arrow ①, when the reproducer 178 requests the lyric information from the external device through the gate module, the external device can extract lyric information.

The display device 100 can request lyric information to the external device through an app-to-app connection, and the external device can receive a request for lyric information from the display device 100 through an app-to-app connection.

Specifically, the external device can extract lyric information such as an ID3 tag or LRC. The ID3 tag can refer to file information stored in an MP3 file, and the LRC can refer to a file format containing lyrics that are operated simultaneously with a music file such as MP3, OGG, or MIDI.

The external device can transmit the extracted lyric information to the reproducer 178 through the gate module.

Specifically, the external device can transmit lyrics to the reproducer 178 by transmitting the ID3 or LRC url to the gate module.

On the other hand, when the reproducer 178 reproduces music of the external device connected through an external input terminal, the reproducer 178 can obtain lyric information by scanning metadata of the content stored in the external device. Specifically, as indicated by an arrow ②, when the reproducer 178 requests lyrics from the metadata scanner 175, the metadata scanner 175 can extract lyric information by scanning the metadata of the content scanned by the file scanner 173.

As such, the controller 170 can extract the lyric information in different ways according to the connection state of the external device that provides music according to the music reproduction command, and can display the extracted lyric information on the display 180. In particular, even when music of the external device is reproduced according to the DLNA standard, the controller 170 can receive lyric information from the external device through an app-to-app connection, and can output lyrics.

Figure 9:
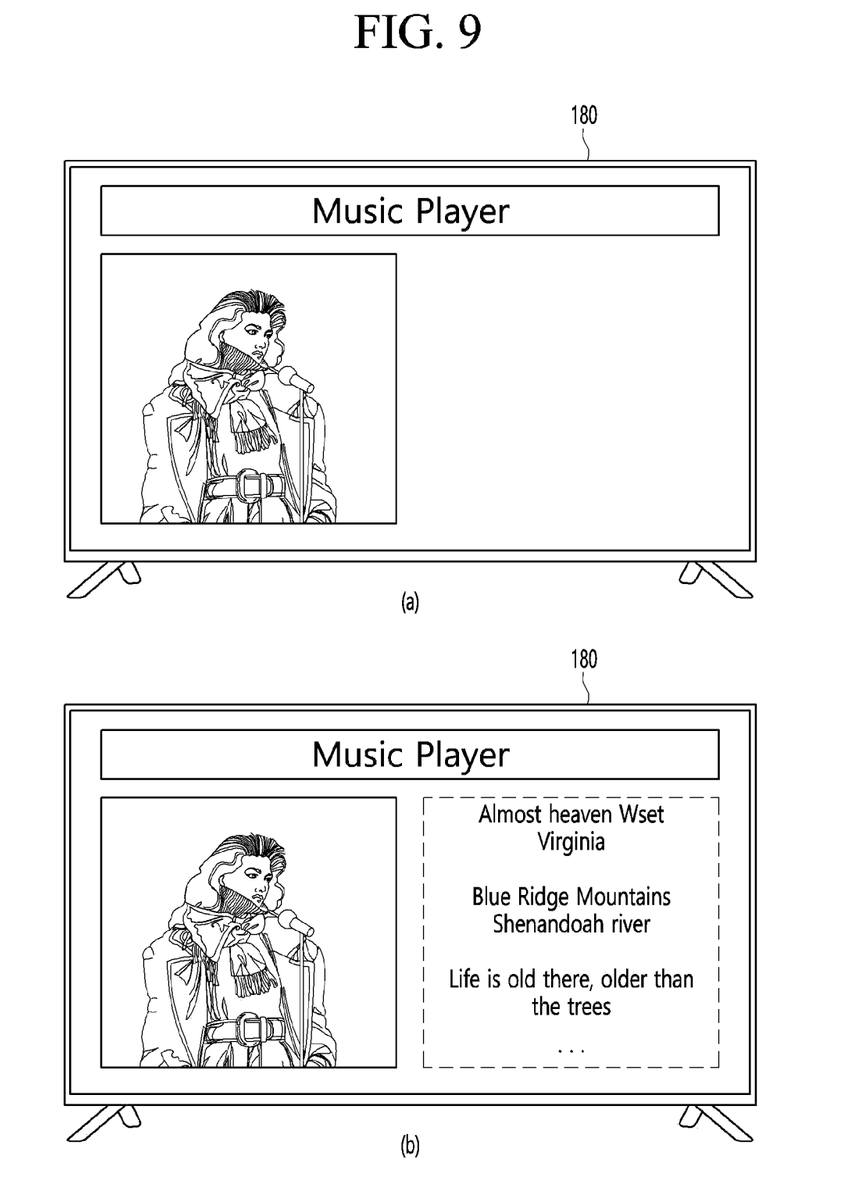
FIG. 9 is a diagram illustrating an example of a screen displayed when the display device reproduces music according to the music reproduction command.

FIG. 9 is a diagram illustrating an example of a screen displayed when the display device reproduces music according to the music reproduction command.

In particular, (a) of FIG. 9 is a diagram illustrating an example of a screen displayed by the display 180 when the conventional display device 100 reproduces music, and (b) of FIG. 9 is a diagram illustrating an example of a screen displayed by the display 180 when the display device 100 according to the present disclosure reproduces music.

When the conventional display device 100 reproduces music of the wirelessly connected external device, lyric information cannot be obtained. Therefore, as shown in (a) of FIG. 9, the controller 170 can display only an album image through the display 180 when reproducing music.

On the other hand, when the display device 100 according to the present disclosure reproduces music of the wirelessly connected external device, lyric information can be obtained from the external device. Therefore, as shown in (b) of FIG. 9, the controller 170 can display lyrics together with an album image through the display 180 when reproducing music.

In this case, the lyrics can include general lyrics, sync lyrics, and lyrics according to the LRC file.

As shown in FIG. 9, the display device 100 according to the present disclosure has an advantage of being able to output lyrics according to music when reproducing music of the external device, regardless of the type of the external device and the connection state of the external device.

In this case, the display device 100 has an advantage of continuously using the DLNA standard for connection with the external device. That is, there is an advantage that the display device 100 does not need to change the standard for content sharing between devices in order to provide lyrics of music.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not Limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
   a display;
   an audio output interface configured to output music received from the external device; and
   a controller configured to:
   determine whether a music reproduction command for outputting music is received via at least one of a wireless connection between the display device and the external device and a wired connection between the display device and the external device,
   in response to receiving the music reproduction command from the external device via the wireless connection, wirelessly transmit a request for lyric information of the music to the external device via a wireless app-to-app connection, receive the lyric information and output the music while displaying lyrics for the music based on the lyric information, and
   in response to receiving the music reproduction command from the external device via the wired connection, scan metadata stored in the external device, extract the lyric information from the metadata, and output the music while displaying the lyrics for the music based on the lyric information.

2. The display device of claim 1, wherein the controller is configured to:
   in response to receiving the music from the external device according to a Digital Living Network Alliance (DLNA) standard, wirelessly transmit the request for the lyric information to the external device.

3. The display device of claim 1, wherein the controller is configured to:
   in response to reproducing the music from the external device according to a Digital Living Network Alliance (DLNA) standard, wirelessly transmit the request for the lyric information to the external device via the wireless app-to-app connection.

4. The display device of claim 1, wherein the controller comprises:
   a file browsing module configured to list contents of the external device;
   a contents module configured to scan the contents listed by the file browsing module and metadata of the contents;
   a reproducer configured to reproduce the contents; and
   a gate module configured to receive the lyric information from the external device.

5. A display system comprising:
   an external device; and
   a display device configured to:
   determine whether a music reproduction command for outputting music is received via at least one of a wireless connection between the display device and the external device and a wired connection between the display device and the external device,
   in response to receiving the music reproduction command from the external device via the wireless connection, wirelessly transmit a request for lyric information of the music to the external device via a wireless app-to-app connection, receive the lyric information and output the music while displaying lyrics for the music based on the lyric information, and
   in response to receiving the music reproduction command from the external device via the wired connection, scan metadata stored in the external device, extract the lyric information from the metadata, and output the music while displaying the lyrics for the music based on the lyric information.

6. The display system of claim 5, wherein, when the music of the external device is reproduced according to a Digital Living Network Alliance (DLNA) standard, the display device is configured to request the lyric information from the external device, and
   wherein the external device is configured to transmit the lyric information to the display device in response to the request.

* * * * *